(12) United States Patent  
Semcken et al.

(10) Patent No.: US 8,462,975 B2
(45) Date of Patent: Jun. 11, 2013

(54) METHOD AND APPARATUS FOR MODIFYING AN AUDIO SIGNAL

(75) Inventors: Kevin R. Semcken, Evergreen, CO (US); H. Christopher Schweitzer, Lafayette, CO (US)

(73) Assignee: Able Planet, Incorporated, Wheat Ridge, CO (US)

( * ) Notice: Subject to any disclaimer, the term of this patent is extended or adjusted under 35 U.S.C. 154(b) by 262 days.

(21) Appl. No.: 12/526,040

(22) PCT Filed: Feb. 11, 2008

(86) PCT No.: PCT/US2008/053627
§ 371 (c)(1),
(2), (4) Date: Aug. 23, 2010

(87) PCT Pub. No.: WO2008/098258
PCT Pub. Date: Aug. 14, 2008

(65) Prior Publication Data
US 2010/0316240 A1    Dec. 16, 2010

Related U.S. Application Data

(60) Provisional application No. 60/888,986, filed on Feb. 9, 2007.

(51) Int. Cl.
*H04R 25/00* (2006.01)
(52) U.S. Cl.
USPC ........... 381/331; 381/400; 381/401; 381/410; 381/406; 381/412; 381/419; 381/420; 381/421
(58) Field of Classification Search
USPC ..... 381/58–59, 331, 400–401, 412, 419–421, 381/410, 117, 115, 406
See application file for complete search history.

(56) References Cited

U.S. PATENT DOCUMENTS

| 4,160,122 A | 7/1979 | Jacobson |
| 4,419,544 A | 12/1983 | Adelman |

(Continued)

FOREIGN PATENT DOCUMENTS

| EP | 0365393 A1 | 10/1989 |
| JP | S55-13432 | 1/1980 |

(Continued)

OTHER PUBLICATIONS

Written Opinion and ISR in International Application No. PCT/US2008/063627 mailed Jul. 29, 2008.

(Continued)

*Primary Examiner* — Disler Paul
(74) *Attorney, Agent, or Firm* — William J. Kubida; Peter J. Meza; Hogan Lovells US LLP (57) ABSTRACT

An electroacoustical apparatus and method is described that alters the output properties of an audio device to improve the sound properties for both hearing impaired and normal hearing listeners. The device includes a coil element of specific design and may incorporate digital signal processing techniques to modify audio signal output. The electrical device and method of processing provides for the beneficial alteration of sound waves to an audio signal, and further modification of the audio signal to provide for improved loudness and clarity characteristics. The improved characteristics provide for greater intelligibility of the audio signal to persons with hearing impairments and to persons with normal hearing.

18 Claims, 10 Drawing Sheets

U.S. PATENT DOCUMENTS

| | | | |
|---|---|---|---|
| 4,637,402 A | 1/1987 | Adelman | |
| 4,689,818 A | 8/1987 | Ammitzboll | |
| 4,697,283 A | 9/1987 | Lafrance et al. | |
| 4,764,957 A | 8/1988 | Angelini et al. | |
| 5,533,120 A | 7/1996 | Staudacher | |
| 5,796,821 A | 8/1998 | Crouch et al. | |
| 6,169,813 B1 | 1/2001 | Richardson et al. | |
| 6,320,959 B1 | 11/2001 | Crouch et al. | |
| 6,785,394 B1 | 8/2004 | Olsen et al. | |
| 6,925,179 B2 | 8/2005 | Waldron et al. | |
| 7,584,010 B2 | 9/2009 | Waldron et al. | |
| 7,657,049 B2 | 2/2010 | Waldron et al. | |
| 7,978,867 B2 * | 7/2011 | Waldron et al. | 381/312 |
| 2002/0141545 A1 | 10/2002 | Segovia | |
| 2003/0031339 A1 | 2/2003 | Marshall et al. | |
| 2005/0117713 A1 | 6/2005 | Waldron et al. | |
| 2006/0029248 A1 * | 2/2006 | Waldron et al. | 381/400 |

FOREIGN PATENT DOCUMENTS

| | | |
|---|---|---|
| JP | S63-74852 | 5/1988 |
| JP | 09-261797 | 10/1997 |
| JP | 2000-340426 | 12/2000 |
| JP | 2001-044042 | 2/2001 |
| WO | 01/72084 A2 | 9/2001 |
| WO | 02/30153 A1 | 4/2002 |
| WO | 03/088709 A1 | 10/2003 |
| WO | WO03088709 A1 | 10/2003 |

OTHER PUBLICATIONS

Hoolihan, Ansi C63.19: Establishing Compatibility Between Hearing Aids and Cellular Telephone, http://web.archive.org/web/20010720043329/http://www.ce-mag.com/archive/01/Spring/Hoolihan.html (archived by the WayBack Machine on Jul. 20, 2001) (retrieved Jul. 19, 2008).

U.S. Appl. No. 10/864,691, filed Jun. 2004 (Waldron et al.).

U.S. Appl. No. 10/864,692, filed Jun. 2004 (Waldron et al.)

Metglas Solutions Microlite. Metglas website [online], Jun. 2002 and Aug. 2002 [retrieved on Mar. 1, 2007]. Retrieved from the Internet: http://web.archive.org/web/2002061604539/www.metglas.com/products/page5_1_6_3.htm, pp. 6.

* cited by examiner

Neural Response

Signal Plus Noice

FIG. 3A

Detection Threshold

Pure Signal

K Wiesenfeld and F Moss (1995) Nature

METHOD AND APPARATUS FOR MODIFYING AN AUDIO SIGNAL

RELATED APPLICATION

This application claims priority to U.S. Provisional Patent Application Ser. No. 60/888,986, filed Feb. 9, 2007. The aforementioned application is incorporated herein by reference.

BACKGROUND OF THE INVENTION

Hearing impairment, to a greater or lesser extent, affects more than 30 million people in the United States, according to the American Academy of Audiology. Hearing impairment can affect its victim in a variety of ways, such as a reduced comprehension of conversation or spoken words, or reduced ability to hear and enjoy music.

Many technologies have been developed to reduce the impact of hearing impairment on those who suffer from it. These technologies include a variety of hearing aids, diagnostic techniques and related devices. Moreover, the improvement of the clarity and intelligibility of audio signals by means of electrical devices has been the object of much investigation, especially for applications in telephony, recording and playback of audio signals for the hearing impaired. The results of previous research in these areas is described in various patent applications, including the following commonly-owned applications: Provisional Patent Application 60/837,752 filed Aug. 15, 2006, patent application Ser. No. 11/188,519 filed Jul. 25, 2005, and patent application Ser. No. 10/864,691 filed Jun. 9, 2004. Application Ser. Nos. 11/188,519, and 10/864,691 are incorporated herein by reference.

The mechanisms of sound propagation and enhancement are complex phenomena which have been the subject of considerable study. While counter-intuitive in concept, researchers have discovered that under certain conditions, human hearing may be enhanced by the addition of noise, which may actually improve signal detection, an effect attributable to a phenomena known as stochastic resonance. Stochastic resonance occurs when random noise is added to a signal, often at very low levels, which enhances the signal to noise ratio in such a way as to drive normally inaudible or barely audible sounds, such as the quiet or softer sounds of a musical passage, above the detection threshold. Hence, at a given output volume setting on a system, such as a radio, the overall quality of the sound is improved, as opposed to the sound which would be heard by a listener who simply turned up the volume to hear a faint signal. In the latter situation, the listener would turn up the noise level as well, to the detriment of the overall quality of the system output.

With respect to hearing impaired individuals, hearing loss may occur over the entire range of audible frequencies or, alternately, over only a portion of or at a single frequency within the audible range. Accordingly, it would be desirable to have the capability of selecting a single frequency or a range of frequencies at which the resonance phenomenon described above occurs, preferably in a system which could be tuned by the user to compensate for his or her specific audio impairment.

SUMMARY OF THE INVENTION

An improved method, using either electrical or digital signal processing (dsp) for modifying an audio signal in an electrical circuit is disclosed which advances the art and overcomes the problems articulated above by providing a passive electrical device that, when connected in series with a transducer or other audio input device, provides an output audio signal with improved clarity and loudness characteristics. The improved method includes passing the signal through a toroidal coil inductor element designed to produce the improved characteristics. The audio signal with improved clarity and loudness is more intelligible to both listeners having normal hearing and to hearing impaired listeners than an audio signal that has not been modified by the device disclosed herein.

DETAILED DESCRIPTION

In prior pending patent applications, a coil has been disclosed for improving the clarity and intelligibility of speech reproduced by a telephone handset. The coil, initially designed for use with a telephone handset equipped with a Hearing Aid Compatible (HAC) coil, has been found to improve the clarity and intelligibility of sound when used without a telephone handset equipped with the HAC coil. In previous applications, the coil has been used in combination with an audio speaker to produce an output with improved clarity and intelligibility.

The present device differs from the previous applications in that it provides for use of the coil in combination with a microphone or other audio transducer to produce an audio signal with improved clarity and intelligibility that may then be recorded or transmitted by other standard means. The sound waves to be processed are converted to electrical signals by the transducer. The electrical signals are then modified by the coil and when converted back to audio, produce an audio signal with improved clarity and intelligibility characteristics.

Figure 4:
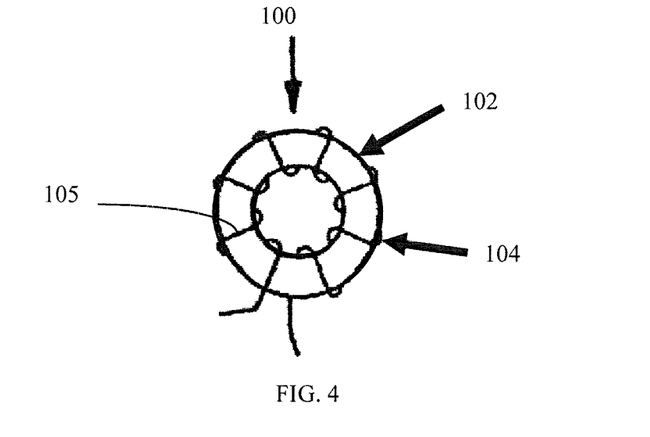
FIG. 4 is an embodiment of the toroidal coil inductor element of the electrical device.

Referring initially to FIG. 4, a view of the coil element of the device is shown. The coil element 100 includes a toroidal core 102 and a winding 104 having a pre-selected number of turns 105. The core 102 may be made in a variety of sizes and of a variety of materials including iron-bearing and other magnetic materials, and it may also consist largely of air.

Figure 5:
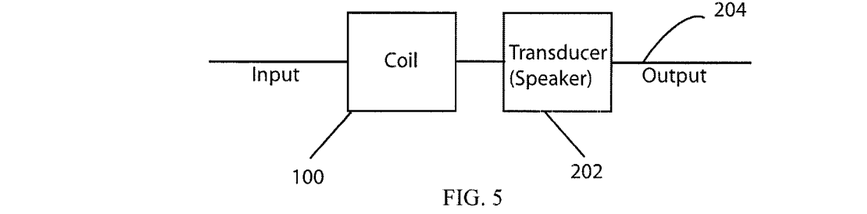
FIG. 5 is a schematic diagram of elements of the system of the present invention.

Referring now to FIG. 5, a schematic diagram of the electrical device 200 for modifying an audio signal is shown. The device 200 includes this coil element 100 and a transducer 202 for converting an electrical signal into an audio signal, which may be subsequently recorded and replayed. The transducer 202 may be a microphone, a speaker or other transducer of a type widely known in the art. The device 200 has lead 204 that may be electrically attached to recording devices or any other device configured for processing, storing or transmitting input audio signals.

Several electro-acoustic and magnetic characteristics of the coil may produce the improvement, either alone or in combination. These characteristics include harmonic distortion and the stochastic resonance of Barkhausen noise, which will be described in greater detail below.

Harmonic distortion is the redistribution of the energy of the audio signal among harmonics of the frequencies that make up the audio signal. The presence of optimally placed harmonics can enrich the auditory experience in a manner analogous to adding the harmonically related notes (for example, a third and fifth) or tones to the base tone of a chord. This may improve the clarity of speech and produce a more 'euphonic' (pleasant sound) represented in the audio signal.

Figure 6:
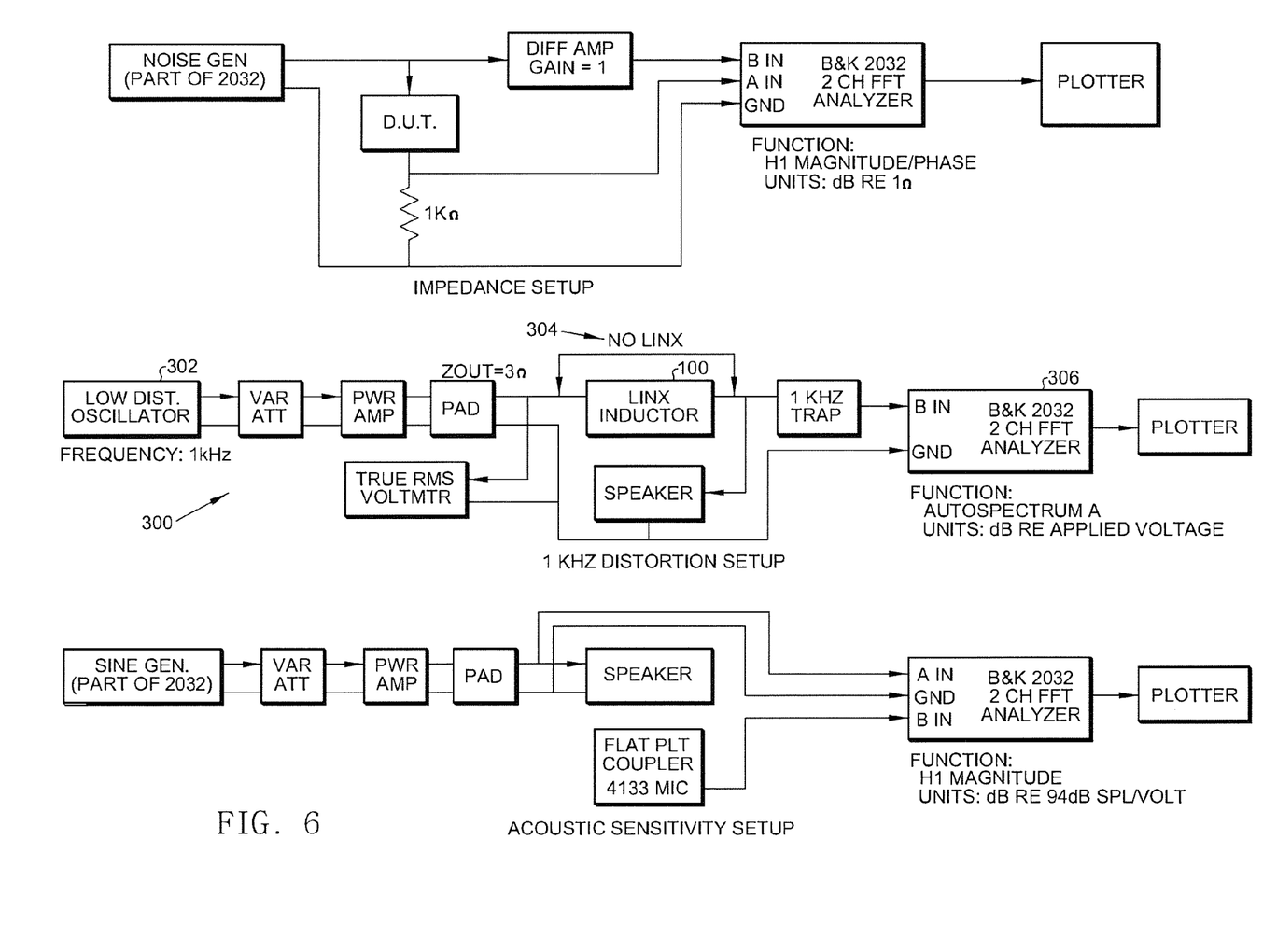
FIG. 6 is a schematic diagram of the testing circuit used to collect the data displayed in FIG. 7.

The device was tested for harmonic distortion and other noise in one specific analysis by means of the test setup shown in FIG. 6 as test setup 300. An oscillator 302 was used to drive a 1 kHz audio signal through the coil element 100; although, it is to be understood that this frequency (1 kHz) and the corresponding results are presented for purposes of illustration only and that analogous results are obtained using audio signals at other frequencies. The oscillator 302 in this test may represent a transducer that has been excited at 1 kHz by a sound wave of the same frequency. The output of the oscillator was recorded by analyzer 306 with the coil element or inductor 100 removed from the system and replaced with a straight electrical connection 304. The output was also recorded by analyzer 306 with the coil element 100 electrically connected to the test circuit.

Figure 7:
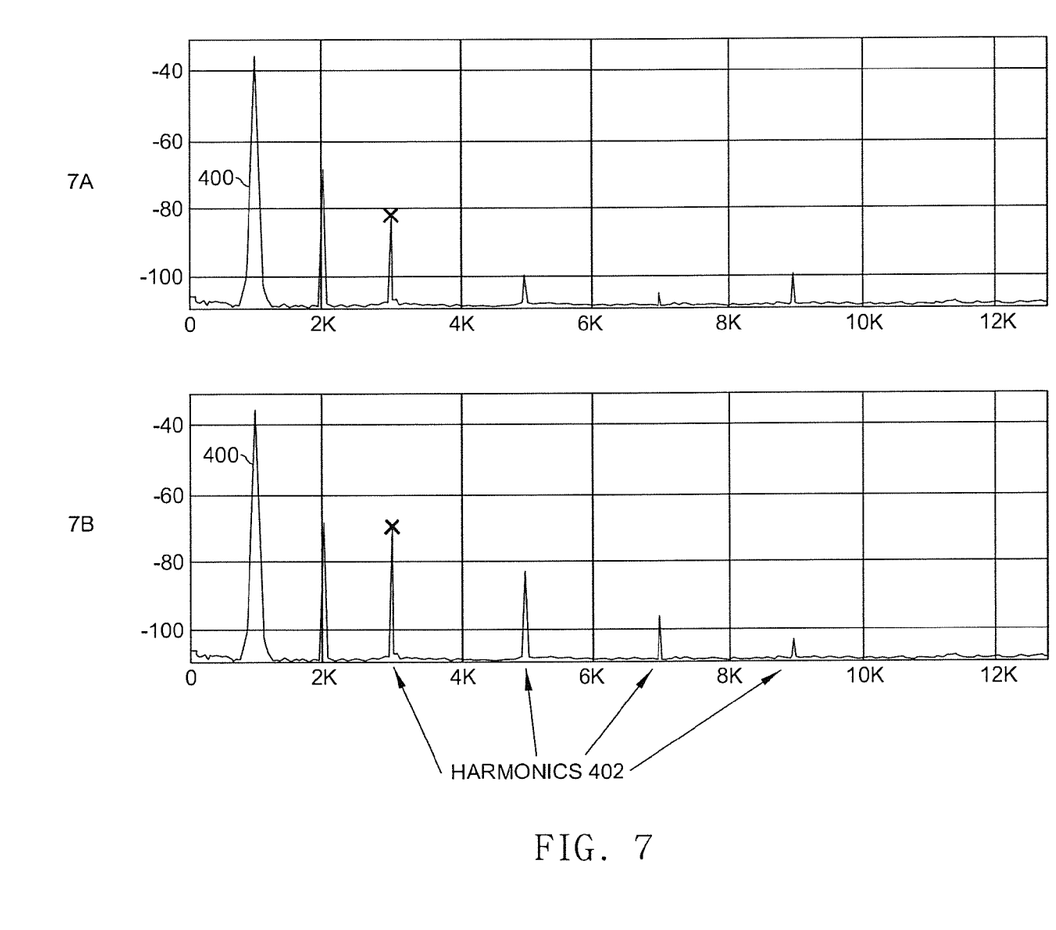
FIG. 7 is a graph of the frequency spectrum of the output of an embodiment of the coil element when excited by a 1 kHz input signal.

The output of the oscillator 302 and coil element 100 are shown in FIG. 7. Chart 7A displays the frequency spectrum of the output of the test setup when the coil element 100 has been removed. The peak 400 at 1 kHz is the signal created by oscillator 302. In FIG. 7B, the harmonics 402 of the 1 kHz input frequency are more intense. The addition of the coil element 100 to the circuit spreads the 1 kHz signal across its harmonics. As shown in 7B, the 3rd, 5th, 7th and 9th harmonics 402 have increased levels with the coil element in place. This type of coherent, harmonic enrichment distortion appears to make the original sounds more clear and intelligble to hearing-impaired listeners and in many cases more desirable in sound quality for non-impaired listeners without increasing the volume of the output. Indeed, the output volume could be turned down without compromising audio quality. In other words, the sound quality would increase at any listening level.

Another possible mechanism by which the coil improves the clarity and loudness of an audio signal is the introduction of one or more forms of noise. There is a small increase in noise with the application of the coil element to an audio signal. It cannot be attributed to thermal or Johnson-Nyquist noise. Thermal noise due to the coil element can only arise in the real part of the impedance which is the resistance of about 5 Ohms in the electrical configuration of this test method and coil sensitivity.

One possible mechanism is Barkhausen noise. Barkhausen noise is characteristic of magnetically permeable steel such as used in the construction of the coil herein disclosed. When a magnetic material is driven through its hysteresis curve by a magnetizing force (H), the magnetic flux density (B) does not vary smoothly with the magnetizing force. Instead it varies in small jumps, as can be seen more clearly in the following drawing, which shows flux density (B) as a function of magnetic field density (H):

Since each jump is a transient phenomenon, there is a noise spectrum associated with it. Observation of this effect is widely used in the steel milling industry to evaluate processing of the steel. In this context fairly high values of B and H are used. However, in the context of the coil element, the values are smaller, but the effect nevertheless exists. It occurs to some degree in all magnetic components.

Figure 8:
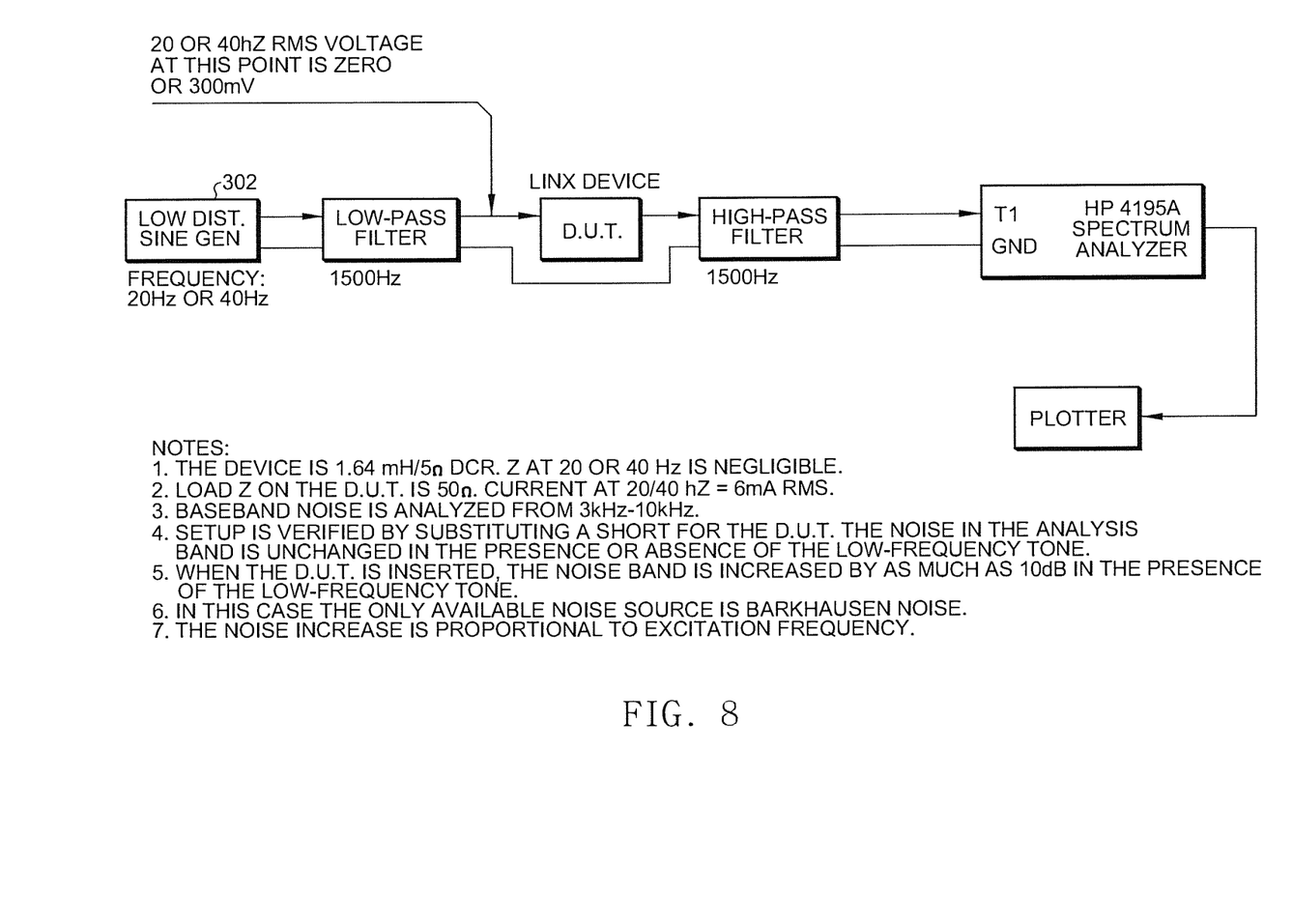
FIG. 8 is a schematic diagram of the testing circuit used to collect the data displayed in FIGS. 9, 10 and 11.

Referring to FIG. 8, the test setup shows a low-frequency generator being used to drive a low-frequency current through the winding, thus exciting the core. As the flux jumps occur, a voltage will be induced in the winding which will cause a noise current to flow. By measuring the voltage across a fixed resistance in series with the winding, while simultaneously rejecting the excitation (low-frequency) current it is possible to observe the effect.

The low-pass filter after the generator removes any harmonic distortion products from the generator. The high-pass filter ahead of the analyzer ensures that the low-frequency signal will not overload the analyzer. The spectrum is then measured with and without the low-frequency excitation.

Figure 9:
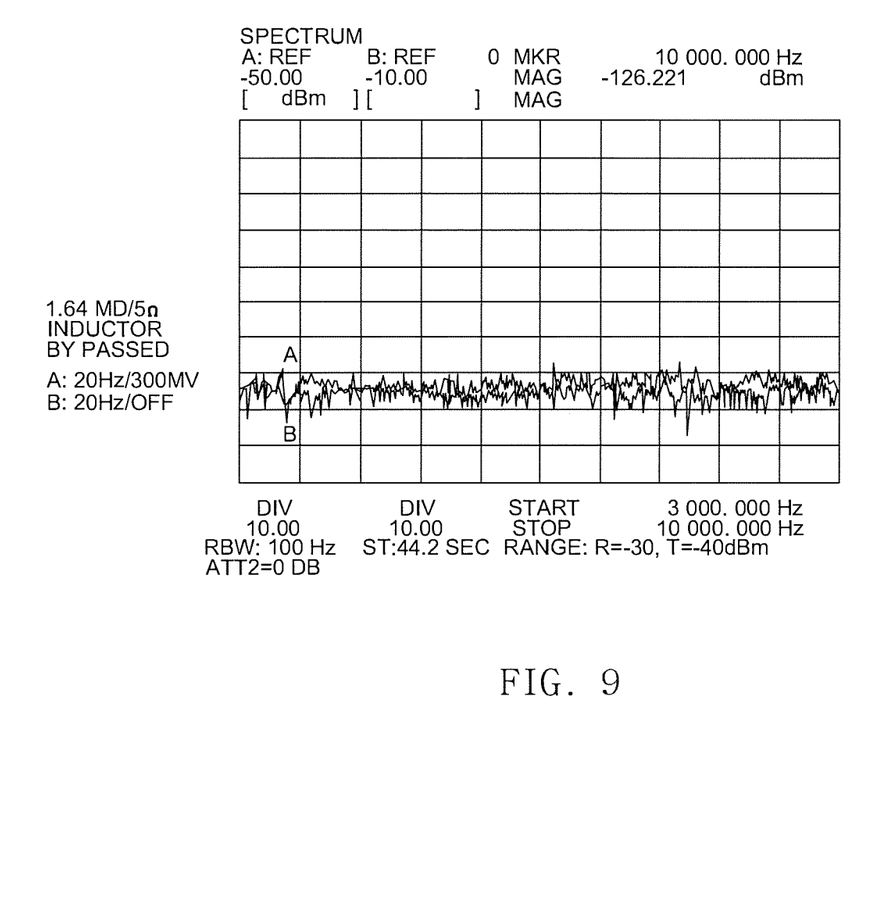
FIG. 9 is a graph of the frequency spectrum of the output of the testing circuit without the coil element.

On FIG. 9, the coil element is replaced with a wire. The spectra with and without the low-frequency signal are identical. This verifies that there are no noise artifacts due to the excitation in the test setup.

Figure 10:
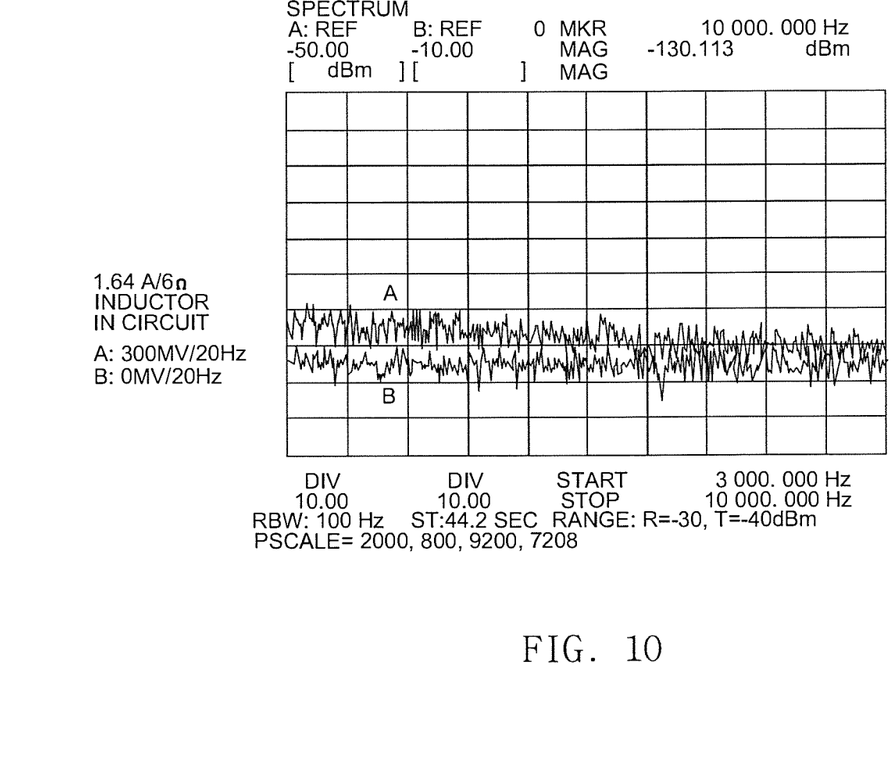
FIG. 10 is a graph of the frequency spectrum of the output of the testing circuit with the coil element.

On FIG. 10, the coil element is present. The low-frequency excitation is set to 20 Hz. The increase in the noise from 3 KHz to 10 KHz can be clearly seen.

Figure 11:
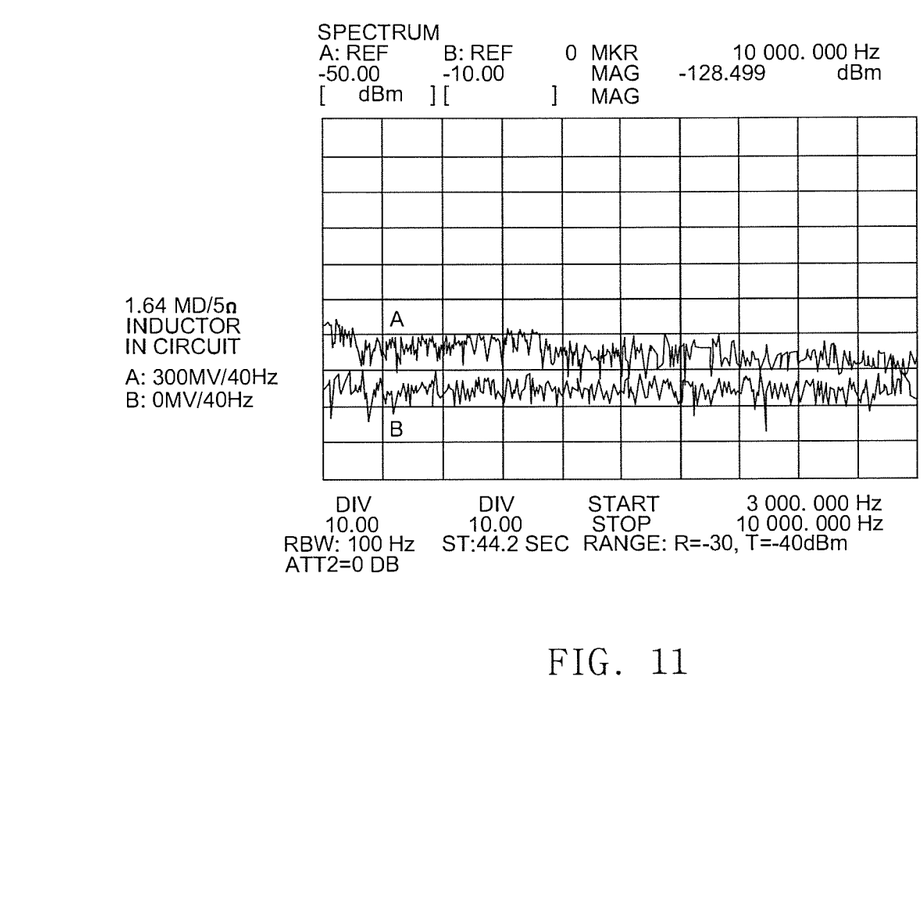
FIG. 11 is a graph of the frequency spectrum of the output of the testing circuit with the coil element.

On FIG. 11, the coil element is present. The low frequency excitation is set to 40 Hz. Again, the noise increase is clear, but it is greater, because twice as many flux jumps per unit time are present as a result of the doubling of the excitation frequency. The increase in the noise floor is about 10 dB, a non-trivial increase in magnitude.

When the desired signal itself is the source of excitation, it becomes very difficult to analytically separate the noise from the cause of the noise. The noise still occurs, but it is difficult to make a clear presentation. An important aspect of the noise is that it is caused by, and is therefore temporally coherent with the signal.

The noise which is added to the signal by this mechanism may play a role in the improvement of hearing threshold through an effect known as stochastic resonance.

Stochastic resonance is a general physical and biophysical phenomenon which can be observed and demonstrated in a variety of systems. It is demonstrable in a counterintuitive way, namely that adding noise to a system may actually improve the signal-to-noise ratio. It has been shown to operate to improve signal detection in neurological operations. This occurs when a system, in this case hearing, receives a signal which is just below what is required to excite it. By adding a small amount of noise (often astonishingly small) the system responds to the signal which was previously unable to elicit a response.

Figure 1:
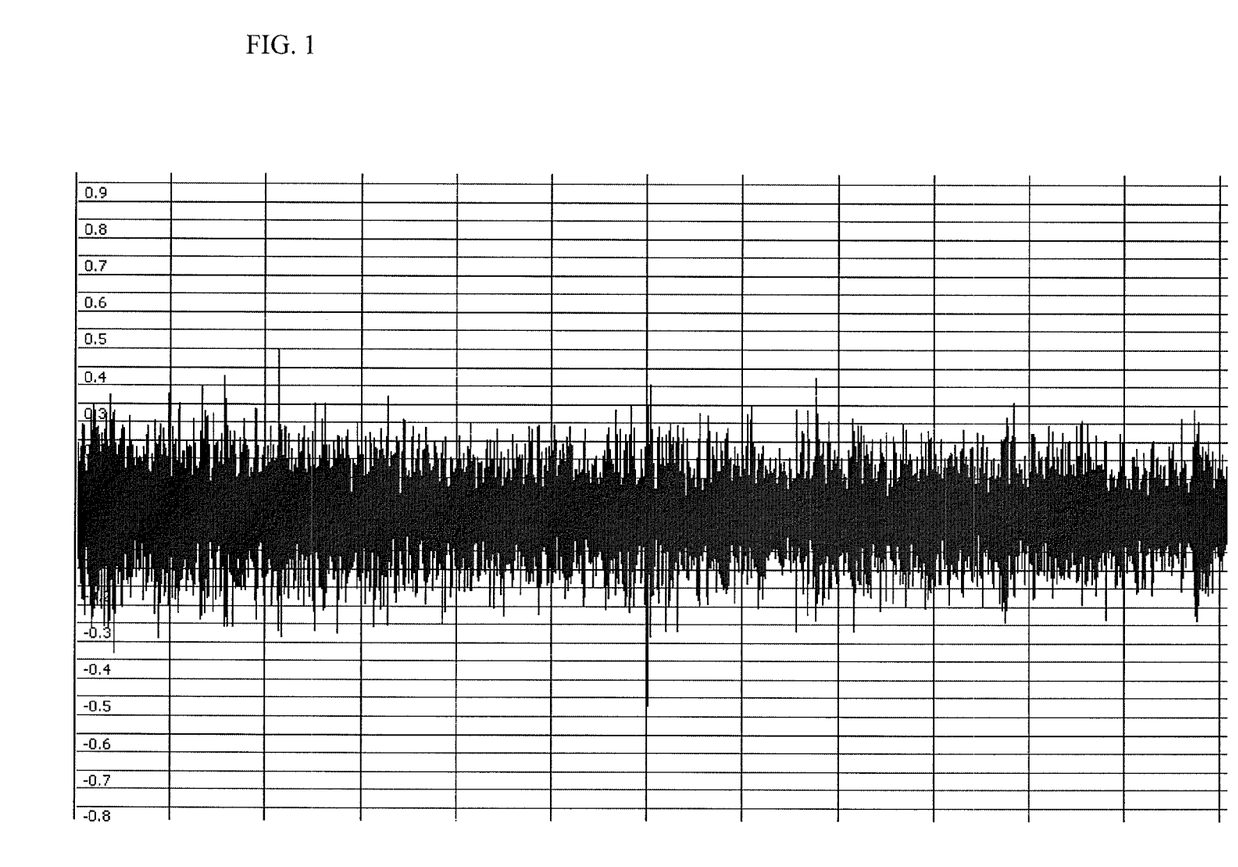
FIG. 1 is an illustration of a sample of random noise generated by the Barkhausen properties of an inductor coil.
Figure 2:
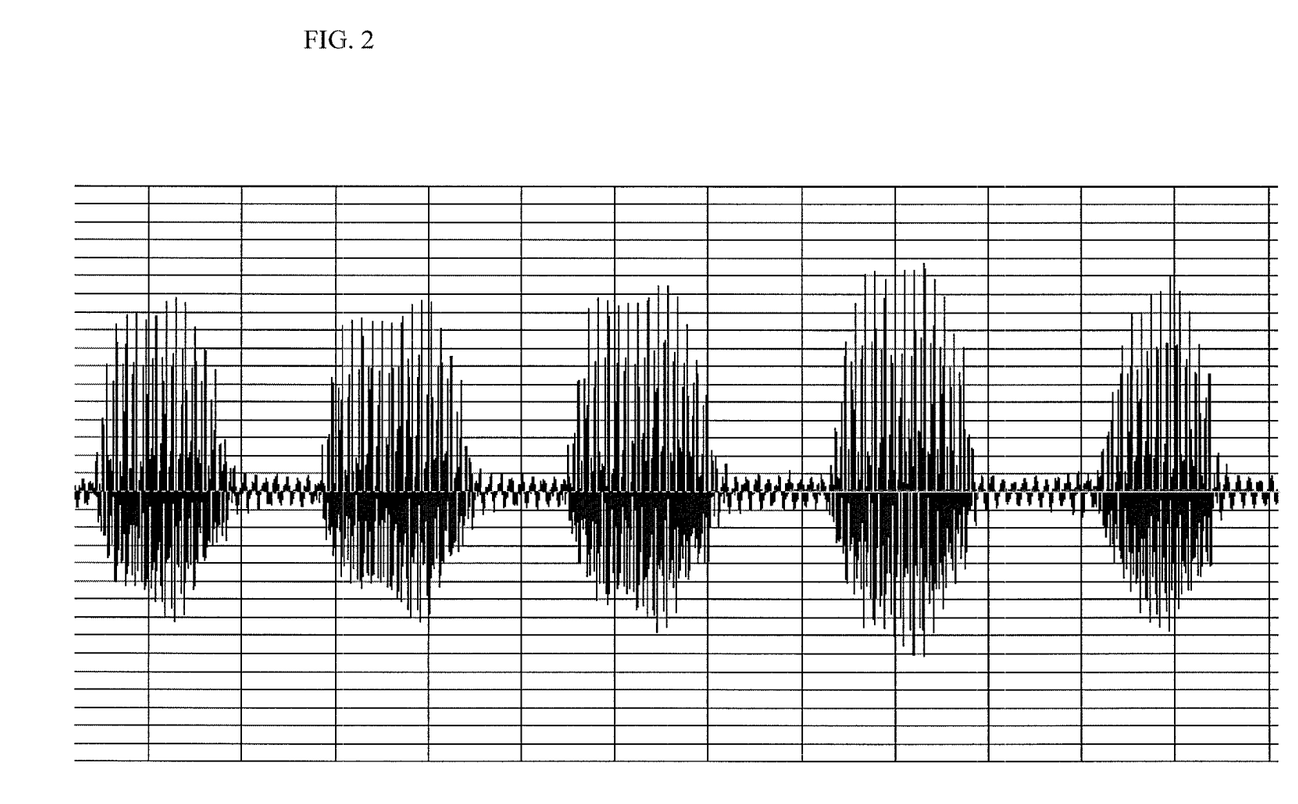
FIG. 2 is an illustration of a sample of speech wave pulses.
Figure 3A:
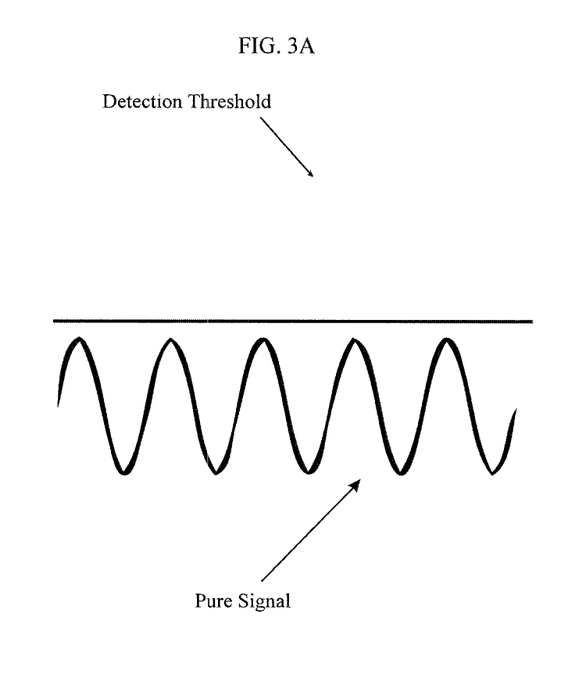
FIG. 3A is an illustration of quiet sound showing it falling below the normal human hearing detection threshold [after *Wiesenfeld & Moss* (1995)].
Figure 3B:
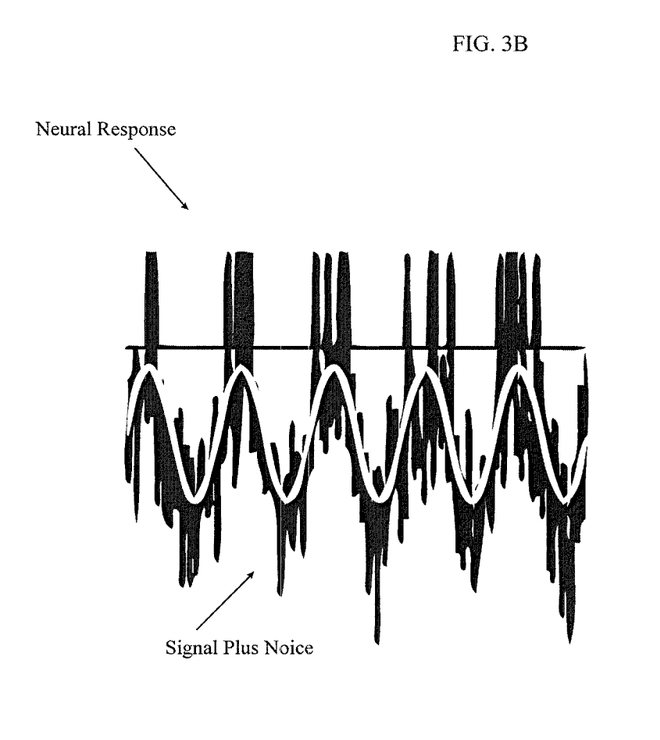
FIG. 3B is an illustration of the effects of stochastic resonance on signal detectability. [Wiesenfeld & Moss, supra].

The phenomenon may be best illustrated by referring to FIGS. 1-3. FIG. 1 depicts a typical audio pattern for the random noise generated by the Barkhausen properties of an inductor coil. These properties are characteristic to the inductor 100 and, at least to some extent, are dependent upon the core configuration, including its shape, size and material composition. As the electrical signal, which corresponds to the audio signal, passes through the inductor and drives it to saturation, by way of example, a series of speech wave impulses as shown in FIG. 2, the noise signal is coherently related to the audio signal because, in fact, the noise results from the form of the audio signal driving the coil. As shown in greater detail in FIGS. 3A and 3B, via the stochastic resonance phenomenon, the presence of the coherently modulated random noise drives what would otherwise be an inaudible audio signal through a detection threshold so that it may become detectable. In the case of a hearing-impaired individual, by way of example, tests may determine specific frequencies at which hearing loss is observable, and the characteristics of the inductor may be selected such that signals generated at those frequencies may be modulated so as to become detectable to that individual.

Changes may be made in the above methods, devices and structures without departing from the scope hereof It should thus be noted that the matter contained in the above description and/or shown in the accompanying drawings should be interpreted as illustrative and not in an limited sense. The following claims are intended to cover all generic and specific features described herein, as well as all statements of the scope of the present method, device and structure, which, as a matter of language, might be said to fall therebetween.

What is claimed is:

1. A method for enhancing an audio signal having a known audio frequency range comprising:
   translating an electrical signal through an audio output device to generate the audio signal;
   providing an inductor within the audio output device, the inductor having a pre-selected configuration including a core of a pre-selected shape, size and material composition, the core being wound with at least one wire and having characteristic Barkhausen properties;
   determining specific frequencies to be enhanced within the audio frequency range;
   generating random Barkhausen noise coherently related to the audio signal by passing the electrical signal through the inductor and driving it to saturation; and
   enhancing the audio signal output at the selected frequencies by coherently modulating the random noise with the audio signal to drive the signal above a threshold of detectability.

2. The method of claim 1 further including configuring the inductor to optimize its impedance properties in response to the frequencies to be enhanced.

3. The method of claim 2 wherein the inductor is configured by selecting the core shape.

4. The method of claim 2 where the inductor is configured by the choice of core material.

5. The method of claim 2 wherein the inductor is configured by selecting the core size.

6. The method of claim 2 wherein the inductor is configured by varying the number of windings of the at least one wire.

7. The method of claim 2 of wherein the inductor is configured by winding the core with two or more wires.

8. The method of claim 7 wherein the inductor is configured by varying the number of windings of the two or more wires.

9. The method of claim 1, further including the application of digital signal processing techniques to enhance the audio signal.

10. An audio signal system comprising:
    an audio signal output device; and
    an audio signal modifying device, the system configured for:
    translating an electrical signal through the audio output device to generate the audio signal;
    providing an inductor within the audio output device, the inductor having a pre-selected configuration including a core of a pre-selected shape, size and material composition, the core being wound with at least one wire and having characteristic Barkhausen properties;
    determining specific frequencies to be enhanced within the audio frequency range;
    generating random Barkhausen noise coherently related to the audio signal by passing the electrical signal through the inductor and driving it to saturation; and
    enhancing the audio signal output at the selected frequencies by coherently modulating the random noise with the audio signal to drive the signal above a threshold of detectability.

11. The system of claim 10 further including configuring the inductor to optimize its impedance properties in response to the frequencies to be enhanced.

12. The system of claim 11 wherein the inductor is configured by selecting the core shape.

13. The system of claim 11 where the inductor is configured by the choice of core material.

14. The system of claim 11 wherein the inductor is configured by selecting the core size.

15. The system of claim 11 wherein the inductor is configured by varying the number of windings of the at least one wire.

16. The system of claim 11 wherein the inductor is configured by winding the core with two or more wires.

17. The system of claim 16 wherein the inductor is configured by varying the number of windings of the two or more wires.

18. The system of claim 10, further configured by the application of digital signal processing techniques to enhance the audio signal.

* * * * *